(12) United States Patent  
Challener et al.

(10) Patent No.: US 9,015,078 B2  
(45) Date of Patent: Apr. 21, 2015

(54) AUDIT TRAILS FOR ELECTRONIC FINANCIAL TRANSACTIONS

(75) Inventors: David C. Challener, Raleigh, NC (US); Richard W. Cheston, Morrisville, NC (US); Randall S. Springfield, Chapel Hill, NC (US); Howard J. Locker, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 934 days.

(21) Appl. No.: 12/748,423

(22) Filed: Mar. 28, 2010

(65) Prior Publication Data

US 2011/0238541 A1    Sep. 29, 2011

(51) Int. Cl.
| | | |
|---|---|---|
| G06Q 20/00 | (2012.01) |
| G06Q 20/40 | (2012.01) |
| G06Q 20/38 | (2012.01) |
| G06Q 40/02 | (2012.01) |
| G06Q 50/26 | (2012.01) |
| G06Q 40/00 | (2012.01) |

(52) U.S. Cl.
CPC .......... *G06Q 20/40* (2013.01); *G06Q 20/38215* (2013.01); *G06Q 20/3825* (2013.01); *G06Q 40/02* (2013.01); *G06Q 50/265* (2013.01); *G06Q 40/12* (2013.01)

(58) Field of Classification Search
USPC .......................................................... 705/75
See application file for complete search history.

(56) References Cited

U.S. PATENT DOCUMENTS

| | | | | |
|---|---|---|---|---|
| 5,596,643 | A | * | 1/1997 | Davis et al. ..................... 705/68 |
| 5,956,404 | A | * | 9/1999 | Schneier et al. ............. 713/180 |
| 5,978,475 | A | * | 11/1999 | Schneier et al. ............. 713/177 |
| 6,199,049 | B1 | * | 3/2001 | Conde et al. .................... 705/24 |
| 2002/0062249 | A1 | * | 5/2002 | Iannacci ......................... 705/14 |
| 2003/0139190 | A1 | * | 7/2003 | Steelberg et al. ............. 709/219 |
| 2006/0075223 | A1 | * | 4/2006 | Bade et al. .................... 713/162 |
| 2006/0212939 | A1 | * | 9/2006 | England et al. ................. 726/22 |
| 2006/0237528 | A1 | * | 10/2006 | Bishop et al. ................. 235/380 |
| 2008/0114989 | A1 | * | 5/2008 | Anbalagan et al. ........... 713/189 |
| 2008/0140667 | A1 | * | 6/2008 | LaBiche ......................... 707/10 |
| 2008/0148064 | A1 | * | 6/2008 | Challener et al. ............. 713/189 |
| 2008/0244569 | A1 | * | 10/2008 | Challener et al. ................. 718/1 |
| 2009/0205044 | A1 | * | 8/2009 | Challener et al. ............... 726/22 |
| 2010/0122250 | A1 | * | 5/2010 | Challener et al. ................. 718/1 |
| 2010/0169968 | A1 | * | 7/2010 | Shanbhogue et al. .......... 726/22 |

(Continued)

OTHER PUBLICATIONS

Wikipedia, Programmable read-only memory, available Jun. 11, 2009 (accessed May 29, 2012), all pages.*

(Continued)

*Primary Examiner* — Jacob C. Coppola  
(74) *Attorney, Agent, or Firm* — Brian J. Pangrle (57) ABSTRACT

An exemplary method includes transmitting, via a network interface, at least a currency amount in an attempt to confirm a financial transaction; responsive to the transmitting, receiving a confirmation indicator for the financial transaction; storing at least the currency amount in non-volatile memory; hashing at least the currency amount to generate a hash and storing the hash in a secure non-volatile memory; hashing at least the currency amount stored in the non-volatile memory to generate a verification hash; and in an attempt to verify at least the financial transaction, comparing the verification hash to the hash stored in the secure non-volatile memory. Various other apparatuses, systems, methods, etc., are also disclosed.

16 Claims, 9 Drawing Sheets

(56) References Cited

U.S. PATENT DOCUMENTS

2010/0299313 A1* 11/2010 Orsini et al. .................. 707/652
2011/0238541 A1* 9/2011 Challener et al. ............... 705/30

OTHER PUBLICATIONS

Ryan, Mark, Introduction to the TPM 1.2, University of Birmingham, Mar. 24, 2009, all pages.*

* cited by examiner

Exemplary Data Scheme 610

| | FT ID | Merchant ID | Time Stamp | Item(s) | Amount | Currency | Other |
|---|---|---|---|---|---|---|---|
| Period Y-2 | 1 | M2 | XX:XX:S | 323453 | 52.26 | US | |
| | 2 | M5 | XX:XX:S | 26654 | 355.50 | Euro | |
| Period Y-1 | 3 | M1 | XX:XX:S | 5646 | 145.00 | BRL | |
| | 4 | M8 | XX:XX:S | 789898 | 10000 | Yen | |
| Period Y | 5 | M2 | XX:XX:S | 323455 | 13.18 | US | |
| | 6 | M2 | XX:XX:S | 323453 | 52.26 | US | |

Exemplary Method 620

Period Y-2: HR2 = SHA-1(0||M252.26US)
HR2 = SHA-1(HR2||M5355.50Euro)
Confirmed Period Y-3: Null HR1

Period Y-1: HR0 = SHA-1(0||M1145BRL)
HR0 = SHA-1(HR0||M810000Yen)

Period Y: HR1 = SHA-1(0||M213.18US)
Confirmed Period Y-2: Null HR2
HR1 = SHA-1(SHA-1(HR1||M252.26US)

FIG. 6

Exemplary Data Scheme 710

| FT ID | Merchant ID | Time Stamp | Amount | Currency | User |
|---|---|---|---|---|---|
| 1 | M2 | XX:XX:S | 52.26 | US | 1 |
| 2 | M5 | XX:XX:S | 355.50 | Euro | 1 |
| 3 | M1 | XX:XX:S | 145.00 | BRL | 2 |
| 4 | M8 | XX:XX:S | 10000 | Yen | 1 |
| 5 | M2 | XX:XX:S | 13.18 | US | 3 |
| 6 | M2 | XX:XX:S | 52.26 | US | 1 |

Exemplary Method 720

AUDIT TRAILS FOR ELECTRONIC FINANCIAL TRANSACTIONS

TECHNICAL FIELD

Subject matter disclosed herein generally relates to techniques for electronic financial transactions.

BACKGROUND

Electronic commerce (e-commerce) includes buying and selling of products or services over the Internet or other electronic networks. E-commerce can be conducted entirely electronically (e.g., for virtual items such as access to premium content on a website) or electronically and physically (e.g., for transportation of physical items). Almost all big retailers have an e-commerce presence on the World Wide Web (e.g., business-to-consumer or B2C) as do entities that engage in business-to-business (B2B) transactions.

A typical transaction involves some exchange of information to facilitate financing or payment. Some transactions schemes rely on services such as VERISIGN® Internet infrastructure services (Mountain View, Calif.) to secure communications between a client and a server. Further, such services have been integrated with client-side trusted platform modules (TPMs). For example, TPMs manufactured by Infineon Technologies AG (Munich, Germany) are configured to carry a VERISIGN® certificate (e.g., which may be used to verify a SSL Root CA Certificate). By placing a SSL Root CA Certificate or a reference to it inside a TPM, it becomes difficult for malware to modify or delete the certificate.

Such advances in security aim to prompt more people to trust and perform electronic financial transactions. As described herein, various exemplary technologies readily provide for audits of electronic financial transactions.

SUMMARY

An exemplary method includes transmitting, via a network interface, at least a currency amount in an attempt to confirm a financial transaction; responsive to the transmitting, receiving a confirmation indicator for the financial transaction; storing at least the currency amount in non-volatile memory; hashing at least the currency amount to generate a hash and storing the hash in a secure non-volatile memory; hashing at least the currency amount stored in the non-volatile memory to generate a verification hash; and in an attempt to verify at least the financial transaction, comparing the verification hash to the hash stored in the secure non-volatile memory. Various other apparatuses, systems, methods, etc., are also disclosed.

BRIEF DESCRIPTION OF THE DRAWINGS

Features and advantages of the described implementations can be more readily understood by reference to the following description taken in conjunction with the accompanying drawings.

DETAILED DESCRIPTION

The following description includes the best mode presently contemplated for practicing the described implementations. This description is not to be taken in a limiting sense, but rather is made merely for the purpose of describing the general principles of the implementations. The scope of the described implementations should be ascertained with reference to the issued claims.

As described herein, various exemplary devices, systems, methods, etc., can generate audit trails for financial transactions. For example, when a user's (or account holder's) hardware is used to perform a payment with a VISA card, secure NVRAM inside the hardware can be extended (e.g., to a running hash) with the details of the financial transaction. The financial transaction data can also be recorded in a log (e.g. QUICKEN® financial data management framework, Intuit, Inc., Mountain View, Calif.). For purposes of verification, financial transaction information in the log can be used to generate a verification hash, which, in turn, can be compared to the secure hash stored in the secure NVRAM. Various exemplary devices, systems, methods, etc., are described below, at times, with reference to examples presented in the figures. Various exemplary devices, systems, methods, etc., may optionally be configured to include or perform aspects of conventional secure transactions (see, e.g., various technologies mentioned in the background section).

Figure 1:
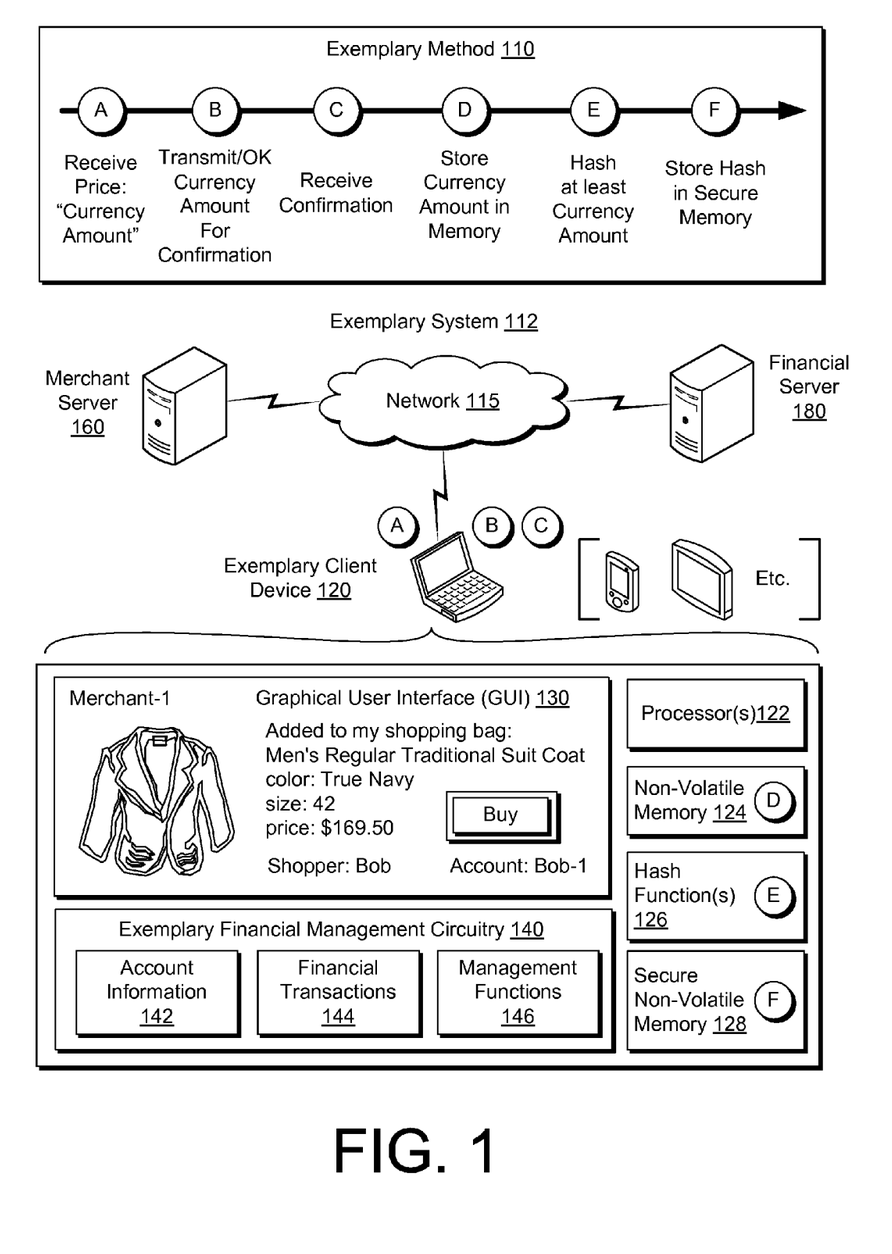
FIG. 1 is a diagram of an exemplary method, system and client device for generating an audit trail.

FIG. 1 shows an exemplary method 110 along with an exemplary system 112 that may implement the method 110. The method 110 is shown along a timeline with various events labeled A, B, C, D, E and F. The particular order of some of these events may differ from the order shown in the example of FIG. 1.

The system 112 includes a network 115 that provides for communication between various components such as an exemplary client device 120, a merchant server 160 and a financial server 180. In the example of FIG. 1, the client device 120 includes one or more processors 122, non-volatile memory 124, one or more hash functions 126, secure non-volatile memory 128, a graphical user interface (GUI) 130, and exemplary financial management circuitry 140 that may provide for account information 142, financial transactions data 144 and management functions 146. As indicated in FIG. 1, the client device 120 may be a smart phone, a tablet, a notebook or, for example, any other device configured to communicate via one or more networks.

Referring again to the timeline of the method 110, event A corresponds to the client device 120 receiving a price. For example, the GUI 130 shows an item offered for sale by Merchant-1 at a price of $169.50. As described herein, a currency amount may be a price of an item or items and optionally include additional costs such as shipping, handling, financing, tax, etc. In various examples, a currency amount represents a total amount for a particular financial transaction.

Per the method 110, an event B corresponds to the client device 120 transmitting a currency amount or an "OK" for a currency amount as part of a financial transaction. For example, where the price $169.50 of the suit coat shown in the GUI 130 includes shipping and tax (if applicable), a user may actuate the "Buy" control of the GUI 130 to thereby cause the client device 120 to transmit the currency amount or to transmit an indicator that acts as an affirmative assent to initiate purchase of the suit coat (e.g., to initiate a financial transaction).

Per the method 110, an event C corresponds to the client device 120 receiving a confirmation for an initiated purchase. For example, the financial server 180 may receive a request to debit an account or otherwise pay for purchase of the suit coat. Such a request may be received by the financial server 180 via the merchant server 160, an intermediate server (not shown) or via the client device 120. In general, one of the parties (e.g., components) involved in the transaction acts to confirm and transmit a confirmation, which may be in the form of a digital confirmation indicator.

The method 110 includes events D, E and F, which may be performed solely on the client device 120. Alternatively, the client device 120 may be in communication with another device that performs one or more of the events D, E and F. In the example of FIG. 1, the client device 120 stores at least the currency amount in the non-volatile memory 124, hashes at least the currency amount using at least one of the one or more hash functions 126 and stores the resulting hash in the secure non-volatile memory 128. Where one or more prior financial transactions have occurred (e.g., for a particular period), the hashing hashes at least the currency amount with an existing hash where the existing hash was generated based on information associated with the one or more prior financial transactions. Accordingly, per events D, E and F, a record of at least the currency amount exists in the non-volatile memory 124 and a hash of at least the currency amount exists in the secure non-volatile memory 128.

As described herein, a trusted platform module (TPM) may include secure non-volatile memory and optionally one or more hash functions. Accordingly, the exemplary client device 120 may include a TPM having the secure non-volatile memory 128 and optionally the one or more hash functions 126. In such an arrangement, the financial management circuitry 140 may instruct the client device 120 to access the TPM such that the TPM hashes at least the currency amount for a financial transaction and stores the resulting hash in its secure non-volatile memory. As described herein, the hash stored in the secure non-volatile memory acts as a record of one or more financial transactions performed via the client device 120. For example, a secure register (e.g., a hash register "HR") may be available to store a hash of at least a currency amount. For a first transaction, a hash function hashes at least the currency amount and the resulting hash is stored in the hash register HR. For a second financial transaction, at least the currency amount of the second financial transaction may be appended to the existing hash (as stored in the hash register HR) and the resulting hash stored in the hash register HR (i.e., to replace the prior value). For a particular hash function HF, this may be represented as HR=HF(0∥FT1) and HR=HF(HR∥FT2) where "∥" represents an append operation and where FT1 and FT2 represent some information about the first financial transaction and some information about the second financial transaction. As described herein, hashing at least a currency amount can include hashing at least a currency amount and an existing hash (e.g., a hash stored in a secure register). In various examples, where a financial transaction is a subsequent financial transaction for a period, hashing hashes at least a currency amount and an existing hash to generate a hash where the generated hash is representative of multiple financial transactions.

Figure 2:
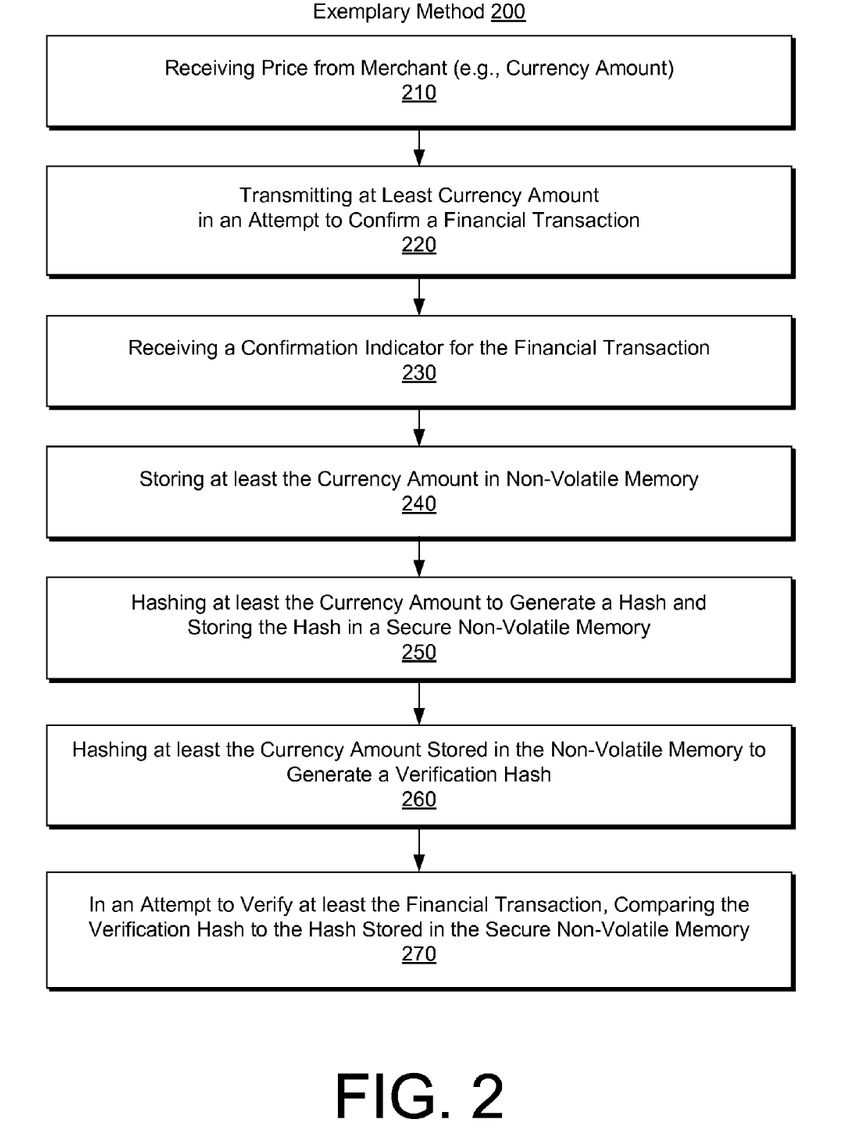
FIG. 2 is a diagram of an exemplary method for hashing financial information and comparing a verification hash to a hash stored in secure non-volatile memory.

FIG. 2 shows an exemplary method 200 that attempts to verify one or more financial transactions. In a receipt block 210, a price (e.g., currency amount) is received from a merchant. In a transmission block 220, a device transmits (e.g., via a network interface) at least a currency amount in an attempt to confirm a financial transaction. In another receipt block 230, the device receives, responsive to the transmission, a confirmation indicator for the financial transaction. In a storage block 240, the device stores at least the currency amount in non-volatile memory (e.g., in local non-volatile memory or other non-volatile memory accessible by the device).

According to the method 200, in a hash block 250, at least the currency amount is hashed to generate a hash and the hash is stored in a secure non-volatile memory. As mentioned where the financial transaction is not the first transaction of interest (e.g., for a period), hashing includes hashing at least the currency amount and an existing hash to generate a hash representative of multiple financial transactions. For example, to generate a hash, hashing can include hashing at least the currency amount of a financial transaction and an existing hash where the existing hash is associated with one or more other financial transactions. As mentioned with respect to the example of FIG. 1, events E and F can be performed by the client device 120 or another device (e.g., in communication with the client device 120). For example, a client device may be networked to a secure device configured to maintain a financial transactions hash and optionally perform one or more hash operations to generate a financial transactions hash.

In the example of FIG. 2, as part of a verification process, another hash block 260 hashes at least the currency amount stored in the non-volatile memory to generate a verification hash. In a verification block 270, in an attempt to verify at least the financial transaction, a comparison occurs that compares the verification hash to the hash stored in the secure non-volatile memory. If the hashes match, then one or more financial transactions are assumed to be verified; otherwise, if the hashes do not match, one or more financial transactions are considered unverified, incorrect, erroneous, etc. In general, if the hashes do not match, it is assumed that information stored in the non-volatile memory that was used to generate the verification hash is inaccurate and possibly compromised. Alternatively, if a hash function used to generate the verification hash has been compromised, this too could lead to a mismatch. As described herein, one or more hash functions relied on to generate a verification hash may be secure and optionally associated with a TPM. For example, the method 200 may include accessing the secure non-volatile memory according to a security protocol associated with a TPM. Further, such secure non-volatile memory may be part of a TPM.

As described herein, the method 200 may include generating a hash for secure storage and a verification hash by hashing at least currency amounts for multiple financial transactions. Where a verification process occurs remote from a client device (e.g., by a financial institution), to facilitate remote verification of at least the financial transaction, the method 200 may include transmitting the hash stored in the secure non-volatile memory via a network interface, transmitting the verification hash via a network interface or transmitting the hash stored in the secure non-volatile memory and the verification hash via a network interface.

As described herein, an exemplary method may include accessing secure non-volatile memory according to a security protocol. For example, such accessing of secure non-volatile memory may occur according to a security protocol that includes providing an identifier value (e.g. a PIN), providing a platform configuration register (PCR) value or providing an identifier value and a PCR value. Where a device (e.g., a client device) includes a hypervisor, access to secure non-volatile memory may occur according to a security protocol that provides a PCR value associated with the hypervisor. For example, the method 200 may include executing a hypervisor to at least perform accessing secure non-volatile memory.

An exemplary method may include issuing a verification indicator where a comparison finds that a verification hash and a secure hash match or issuing an alert where the comparison finds that the hashes do not match.

Figure 3:
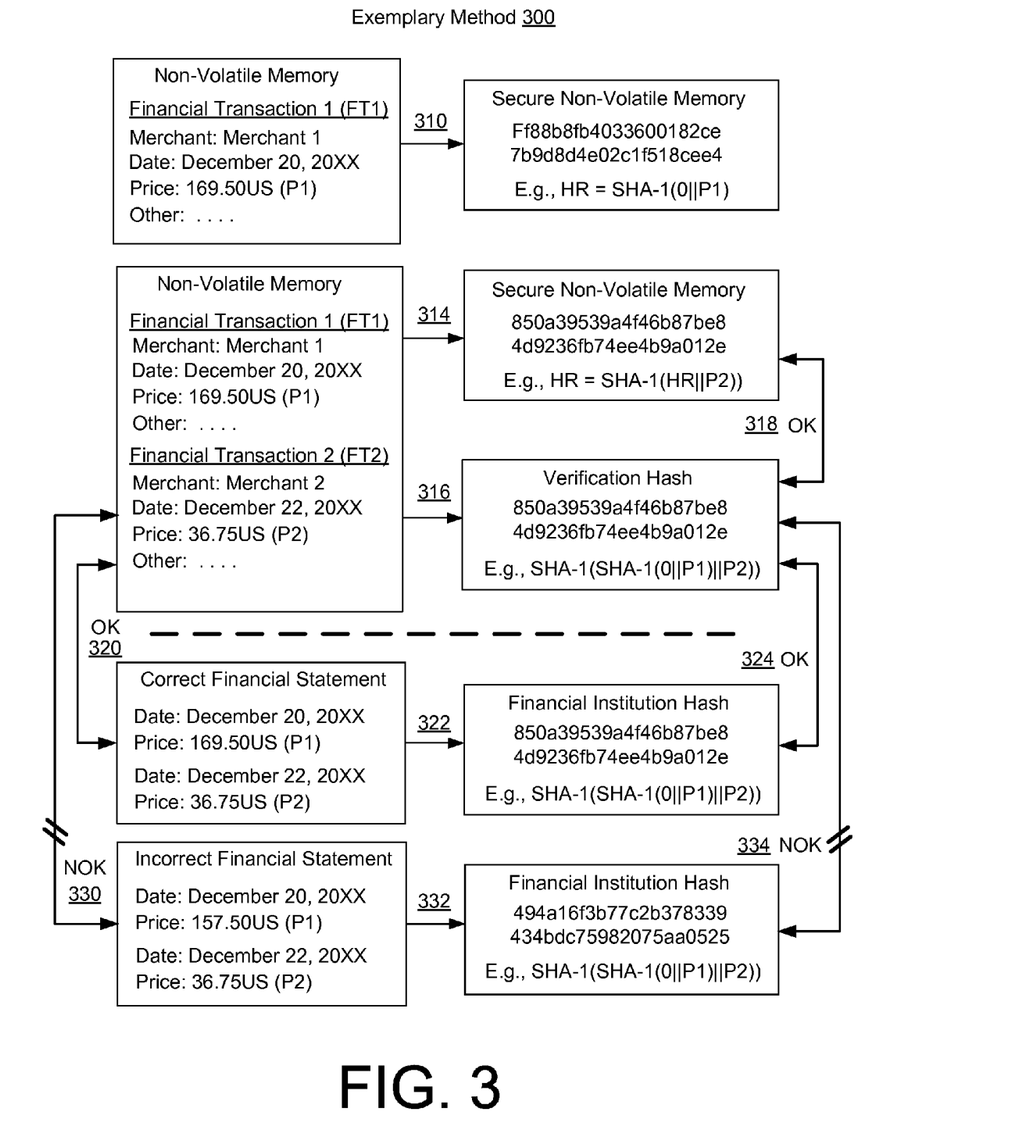
FIG. 3 is a diagram of an exemplary method comparing information and hashes associated with one or more financial transactions.

FIG. 3 shows an exemplary method 300 that involves comparing financial transactions data or hashes based at least in part on financial transactions data. For a first financial transaction (FT1), per step 310, the method 300 hashes information and stores a hash in secure non-volatile memory (e.g., hash register HR). For a second financial transaction (FT2), per step 314, the method 300 hashes information (including the existing hash HR) and stores a resulting hash in secure non-volatile memory. As indicated in the example of FIG. 3, the hash function may be the SHA-1 function and it may extend an existing hash by appending new information to an existing hash (e.g., character string). For non-initial financial transactions, whether an exemplary hashing process appends the information or uses another operation or algorithm, the resulting hash for secure storage is based on an existing hash and information of the most recent (i.e., current) financial transaction of interest. For an initial financial transaction, an exemplary hashing process may append the information to, for example, a null value and securely store the resulting hash.

Per step 316, the method 300 hashes information to generate a verification hash. Per step 318, the verification hash can be compared to the hash stored in the secure non-volatile memory. In the example of FIG. 3, these two hashes match.

The method 300 further includes steps that may be performed at least in part by a financial institution (see, e.g., the financial server 180 of FIG. 1). Per step 320, information in a financial statement is compared to financial information stored in the non-volatile memory. According to the step 320, the information matches and is deemed "OK". Per step 322, information in the financial statement is hashed to generate a hash. Per step 324, this hash is compared to the verification hash and it compares favorably (i.e., a match).

Referring to step 330, an incorrect financial statement does not compare favorably to the financial information stored in the non-volatile memory (i.e., "NOK"). Per step 332, a hash is generated based on the incorrect financial statement and per step 334, this hash compares unfavorably to the verification hash (i.e., the financial institution hash does not match the verification hash).

The various steps in the method 300 may be used to logically determine where issues exist and which records may be in error. As described herein, an exemplary audit trail can be generated and used to verify financial transactions and can optionally be used forensically to determine where errors or inconsistencies exist (e.g., between a user or users and a financial institution).

Figure 4:
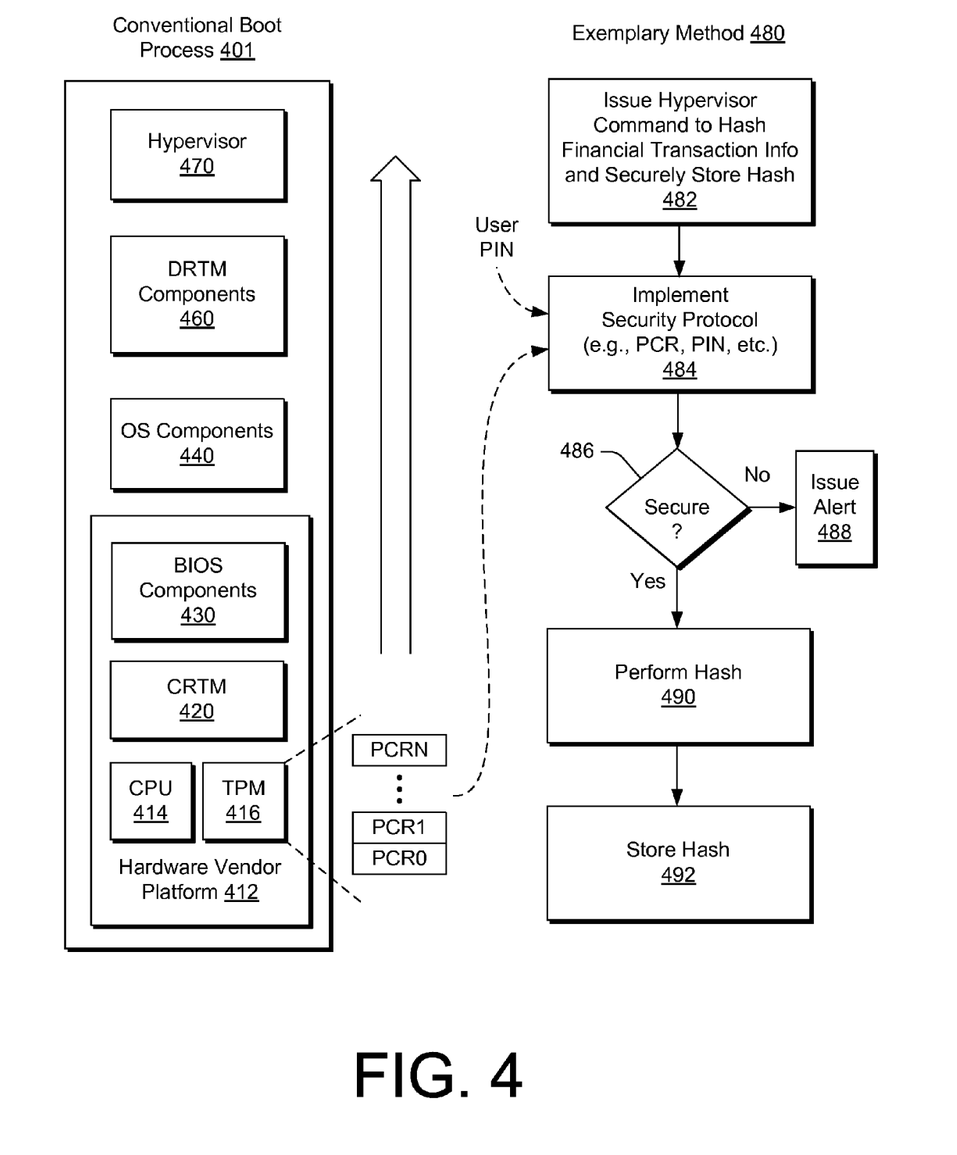
FIG. 4 is a diagram of an exemplary method that implements a security protocol to access secure non-volatile memory.

As mentioned, an exemplary method may include accessing secure non-volatile memory via a secure protocol. FIG. 4 shows a conventional boot process 401 and an exemplary method 480 that may rely on a PCR value generated during the boot process 401.

In the conventional boot process 401, a hardware vendor platform 412 includes a CPU 414 and a TPM 416. The TPM 416 includes various secure registers, often referred to as PCRs. During the conventional boot process 401, core root of trust measurement (CRTM) code 420 and BIOS code components 430 are executed with assurances from the TPM 416. Specifically, the TPM 416 securely holds "measurements" of the code 420 and 430 by storing values in the PCRs. A conventional approach relies on a so-called "extend" function that hashes a stored value and a code value and stores the result in a PCR. For example, a PCR may store SHA-1 (value1∥value2) where value1 is a SHA-1 hash of a code value and value2 is a code value concatenated to value1. The concatenated value is SHA-1 hashed and stored to the PCR.

As common in computing, the hardware platform 412 is provided with a third-party operating system, represented by OS components 440. In the example of FIG. 4, after the hardware is up and running, BIOS usually provides instructions for loading the OS components 440. After loading the OS components 440, a dynamic root of trust measurement session may commence based on DRTM code 460. The DRTM 460 aims to extend assurances of secure computing beyond the CRTM. In essence, the DRTM aims to maintain a chain of trust as applications or other modules are executed. As shown in FIG. 4, a hypervisor 470 may be loaded once a DRTM session has been established where the DRTM acts to guarantee secure computing. Code associated with the hypervisor 470 may be measured and a corresponding value stored in one of the PCRs.

Referring to the method 480, in an issuance block 482, the hypervisor 470 issues a command to hash financial transaction information and to securely store the resulting hash. In an implementation block 484, a security protocol is implemented that relies, for example, on one or more values stored in the various PCRs associated with the TPM 416. Alternatively, or additionally, the security protocol may rely on a user personal identifier such as a PIN. According to the method 480, a decision block 486 follows that decides whether secure access can be achieved. If the decision block 486 decides that secure access is not possible (e.g., security protocol fails), the method 480 may enter an alert block 488 and issue an alert. Where the security protocol succeeds to thereby allow for secure access, the method 480 continues to a performance block 480 to hash financial transaction information and to a storage block 492 to store the resulting hash in secure non-volatile memory.

As mentioned, a TPM (e.g., the TPM 416) may include secure non-volatile memory and optionally one or more secure hash functions that can be instructed to generate a hash based on financial transactions information. For example, the hypervisor 470 may include financial transaction management instructions that call for access to the TPM 416 to securely hash financial transactions information and store the resulting hash in secure non-volatile memory.

As described herein, one or more exemplary computer-readable media can include processor-executable instructions to instruct a processor to: hash at least a currency amount for each of a plurality of financial transactions; access, according to a security protocol, a secure hash stored in secure, non-volatile memory; and, issue an alert if the hash does not match the secure hash. Such computer-readable media may include instructions to access one or more platform configuration registers (PCRs). As described herein, one or more computer-readable media may include instructions to instruct a processor to store, hash, etc., financial transactions information. One or more computer-readable media may include instructions to access or receive a personal identifier number (PIN) (e.g., as part of a security protocol).

As described herein, a security protocol can avoid issues such as an "evil program" writing to data in a spreadsheet and corrupting a hash where the hash is not secured or only weakly secured. Such an attack would make auditing financial transactions nearly impossible.

Accordingly, as described herein, secure non-volatile memory for storing one or more hashes may be locked with a credential (e.g., a PIN) such that when a user makes a purchase, the PIN would have to be entered to unlock the secure non-volatile memory (e.g., NVRAM). Such an approach acts to insure that the user/owner approved the financial transaction. As mentioned, non-volatile memory may be locked with a PCR value. For example, a PCR could be locked to a hypervisor (or other module) such that the hypervisor could protect against an attack by an "evil program" to avoid any changes to information stored in the secure non-volatile memory. By securing non-volatile memory for storage of one or more hashes, any attempt to challenge the log would have problems since the secure non-volatile memory can only be unlocked or changed under a known secured environment.

Figure 5:
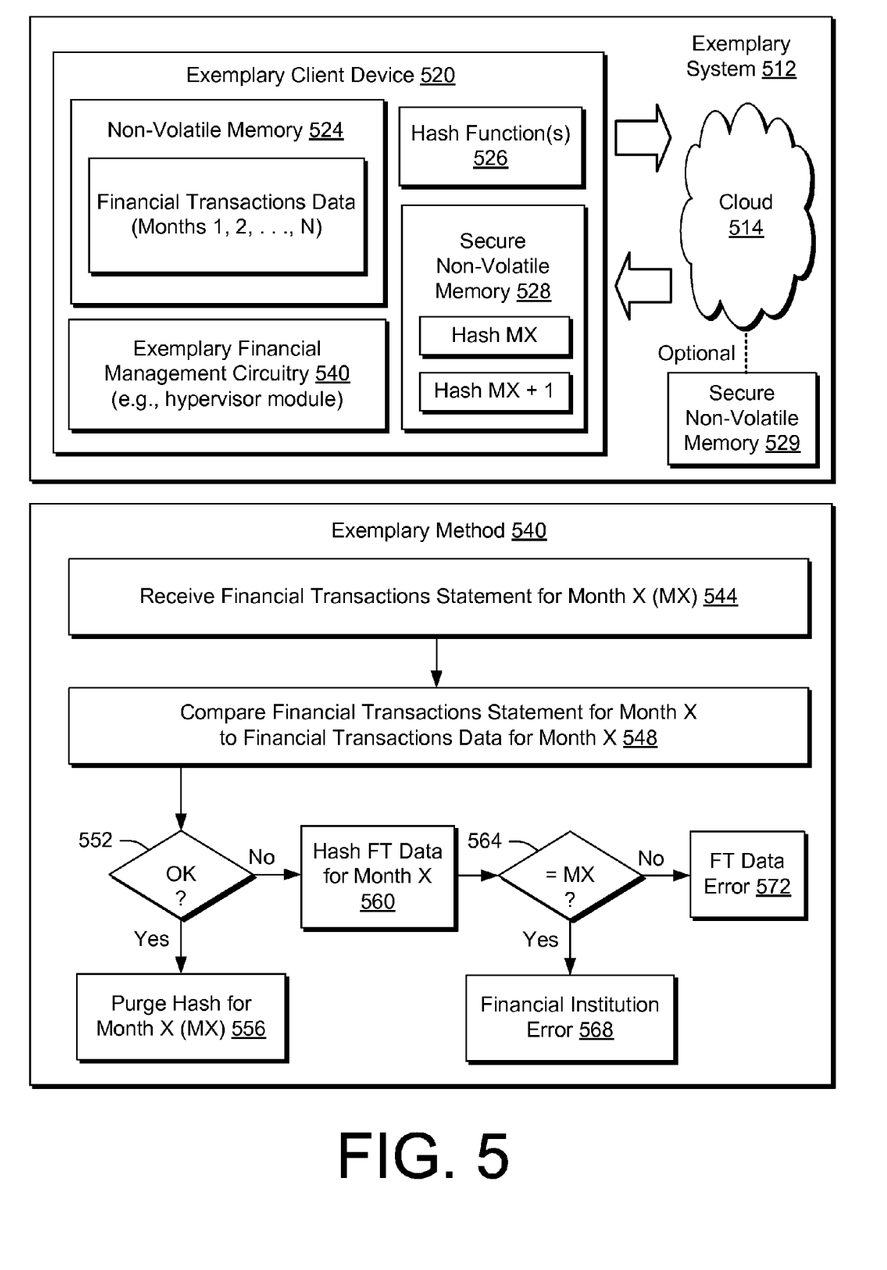
FIG. 5 is a diagram of an exemplary system, client device and method for assessing information in a financial transactions statement.

FIG. 5 shows an exemplary system 512, an exemplary client device 520 and an exemplary method 540. The method 540 may be implemented, at least in part, by the client device 520. In the example of FIG. 5, secure non-volatile memory 528 or 529 include multiple registers for storage of hashes. For example, non-volatile memory 524 stores financial transactions data for multiple months (e.g., 1, 2, . . . , N) and the secure non-volatile memory 528 includes a hash register for month X (MX) and for month X+1 (MX+1). The system 512 is shown as including the client device 520 and "the cloud" 514, which includes various networks and network devices, optionally including the secure non-volatile memory 529. As described herein, "the cloud" may include the Internet or one or more other networks that include various networked computing and storage resources (e.g., as used in so-called cloud computing).

In the example of FIG. 5, the method 540 includes a reception block 544 for receiving a financial transactions statement for a particular month, Month X (MX). In a comparison block 548, the statement for Month X (MX) is compared to financial transactions data for Month X (see, e.g., the non-volatile memory 524). A decision block 552 decides whether the comparison is favorable (i.e., data matches). If so, the method 540 proceeds to a purge or overwrite block 556 that allows data in the register for month MX (see, e.g., the secure non-volatile memory 528) to be purged or overwritten. If the decision block 522 decides that a match does not exist, the method 540 proceeds to a hash block 560 that hashes financial transaction data for Month X as stored in the non-volatile memory (see, e.g., the non-volatile memory 524). Provided the resulting verification hash, another decision block 564 decides whether the verification hash of the financial transactions data for Month X matches the securely stored hash MX as stored in the secure non-volatile memory (see, e.g., the secure non-volatile memory 528). If the decision block 564 decides that a match exists, then the method 540 continues to an error reporting block 568 that reports a financial institution error. If the decision block 564 decides that the hashes do not match, the method 540 continues to an error reporting block 572 that reports a financial transactions data error.

The foregoing method assumes that a hash stored in secure non-volatile memory is accurate and not corrupt. Accordingly, if the method 540 reaches error block 572, one logical conclusion is that the financial transactions data stored in non-volatile memory is corrupt, which is the reason why the verification hash does not match the hash stored in the secure non-volatile memory and why the data in the non-volatile memory does not match that of the financial transactions statement. Where the method 540 reaches the error block 568, it is assumed that the hash stored in secure non-volatile memory is accurate and not corrupt such that it can act to verify the financial transactions data stored in non-volatile memory. Logically, the financial transactions statement may be called into question for its accuracy.

Figure 6:
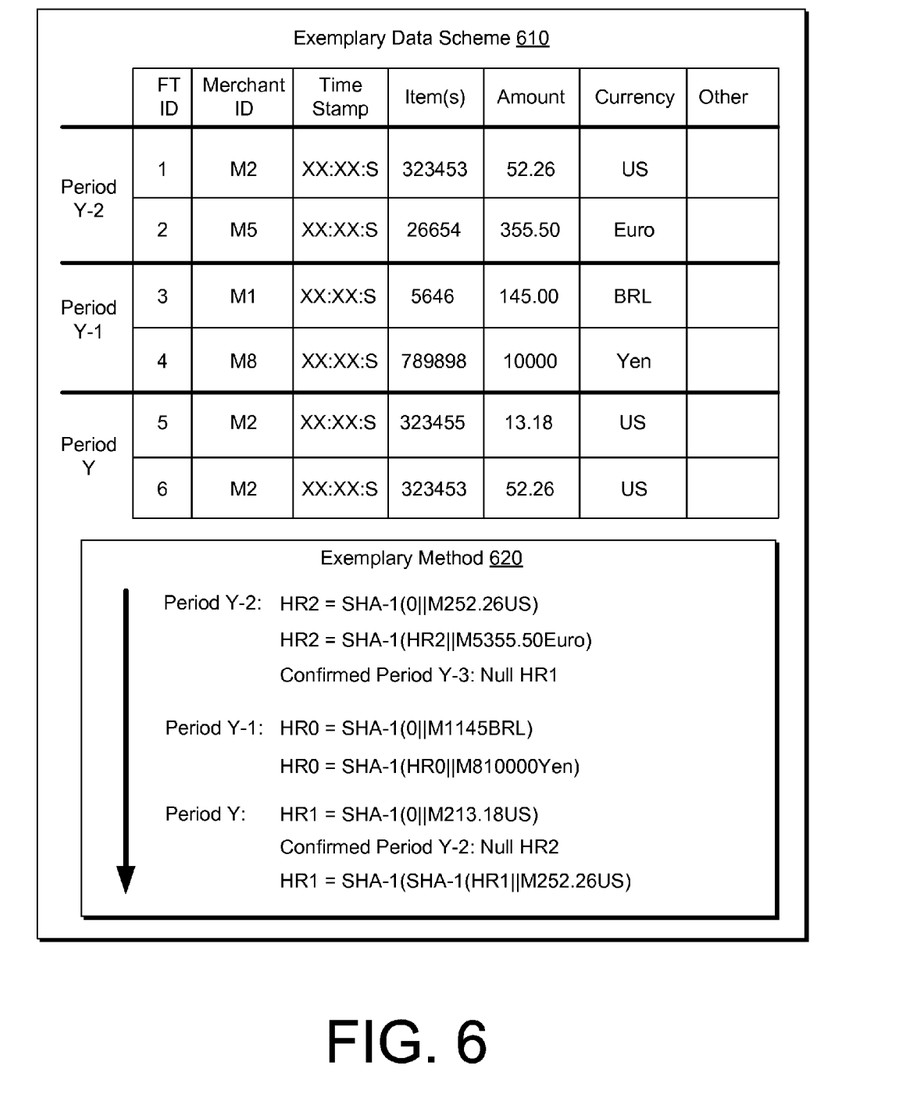
FIG. 6 is a diagram of an exemplary data scheme and method that rely on various registers to store hashes in secure non-volatile memory.

FIG. 6 shows an exemplary data scheme 610 along with an exemplary method 620. The data scheme 610 shows data for various periods (labeled Period Y-2, Y-1 and Y) as well as some examples of the types of information that may be stored in non-volatile memory and relied on to generate one or more hashes.

The exemplary method 620 is shown with respect to a timeline for Periods Y-2, Y-1 and Y. In this example, three secure hash registers, HR0, HR1 and HR2, are relied on for record keeping over multiple periods. In Period Y-2, HR2 stores a hash for financial transaction ID 1 (FT ID 1) based, for example, on the Merchant ID, the currency amount and the type of currency. As indicated, the hash is extended for FT ID 2, based on the information "M5355.50Euro". Next, a confirmation occurs for a prior Period Y-3. Responsive to a confirmation for a preceding period, one of the secure hash registers is nulled (e.g., purged, marked for overwriting, etc.). In the example of FIG. 6, HR1 is nulled.

For Period Y-1, HR0 is used to store a hash and an extended hash for FT ID 3 and FT ID 4. However, during period Y-1, a confirmation does not occur for Period Y-2. Thus, when Period Y commences, HR1 is relied on as it has been nulled previously (responsive to confirmation of Period Y-3). During Period Y, a confirmation occurs for Period Y-2 and HR2 is nulled.

While FIG. 6 shows a method that includes three secure hash registers, as described herein, any suitable number of registers may be used to securely store a hash. If validation occurs for a period before any financial transactions occur for a subsequent period, an exemplary approach may rely on a single register. For example, if validation occurs during a short "lock-out" between two adjacent periods (e.g., less than a minute or so in an early morning hour that is unlikely to interfere with a user financial transaction), validation may be ensured to occur before a first financial transaction of the latter period.

Figure 7:
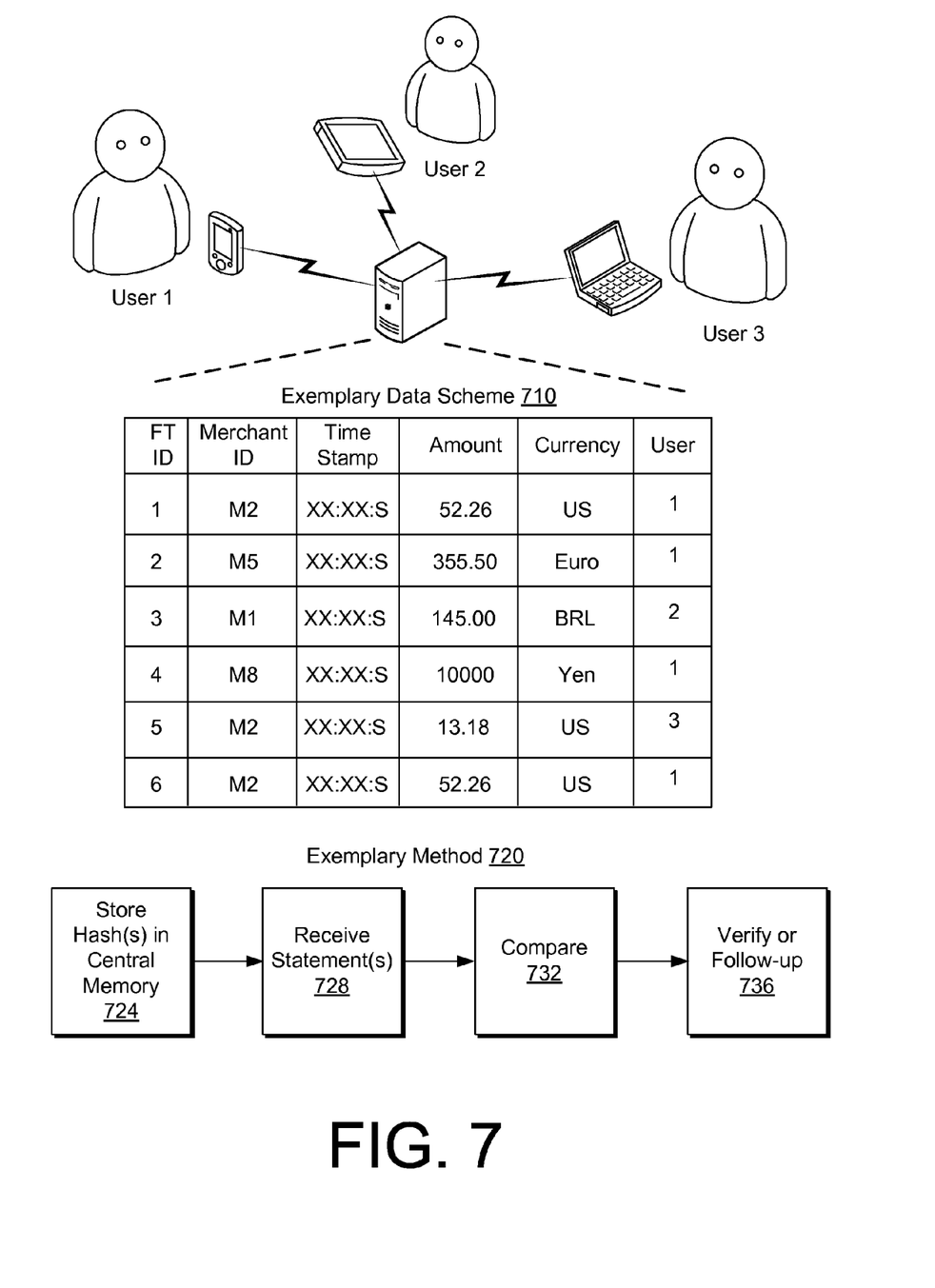
FIG. 7 is a diagram of exemplary data scheme and method associated with financial transactions for a group of users.

FIG. 7 shows an exemplary data scheme 710 and an exemplary method 720 for a group of users or account holders (see, e.g., User 1, User 2 and User 3) that rely on a central storage device. As indicated, the data scheme 710 includes a user identifier field (e.g., 1, 2 or 3).

The method 720 includes a storage block 724 that stores one or more hashes in a central secure non-volatile memory. A reception block 728 receives one or more statements for financial transactions performed by at least some of the group of users or account holders. A comparison block 732 compares information in the one or more statements to data stored in non-volatile memory (e.g., of a central storage device). Depending on the outcome of the comparison (see, e.g., the method 540 of FIG. 5), the method 720 may continue to a verification or follow-up block 736. Depending on the number of hashes stored, an exemplary verification or follow-up process may allow for identification of a user associated with a financial transaction for which an error exists. For example, if a hash process sorts financial transactions data for each of the users, generates individual user hashes and stores the user hashes separately in secure non-volatile memory, then verification hashes may be generated on a user-by-user basis and compared to the user hashes stored in secure non-volatile memory.

As described herein, the data scheme 710 and method 720 of FIG. 7 may be implemented, for example, for a family, a group of individuals, a corporation, other entity, etc.

With respect to a hypervisor, a hypervisor may be or include features of the XEN® hypervisor (XENSOURCE, LLC, LTD, Palo Alto, Calif.). In a XEN® system, the XEN® hypervisor is typically the lowest and most privileged layer. Above this layer one or more guest operating systems can be supported, which the hypervisor schedules across the one or more physical CPUs. In XEN® terminology, the first "guest" operating system is referred to as "domain 0" (dom0). In a conventional XEN® system, the dom0 OS is booted automatically when the hypervisor boots and given special management privileges and direct access to all physical hardware by default. With respect to operating systems, a WINDOWS® OS, a LINUX® OS, an APPLE® OS, or other OS may be used by a computing platform.

As described herein, various acts, steps, etc., can be implemented as instructions stored in one or more computer-readable media. For example, one or more exemplary computer-readable media can include computer-executable instructions to instruct a computer to implement security.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Figure 8:
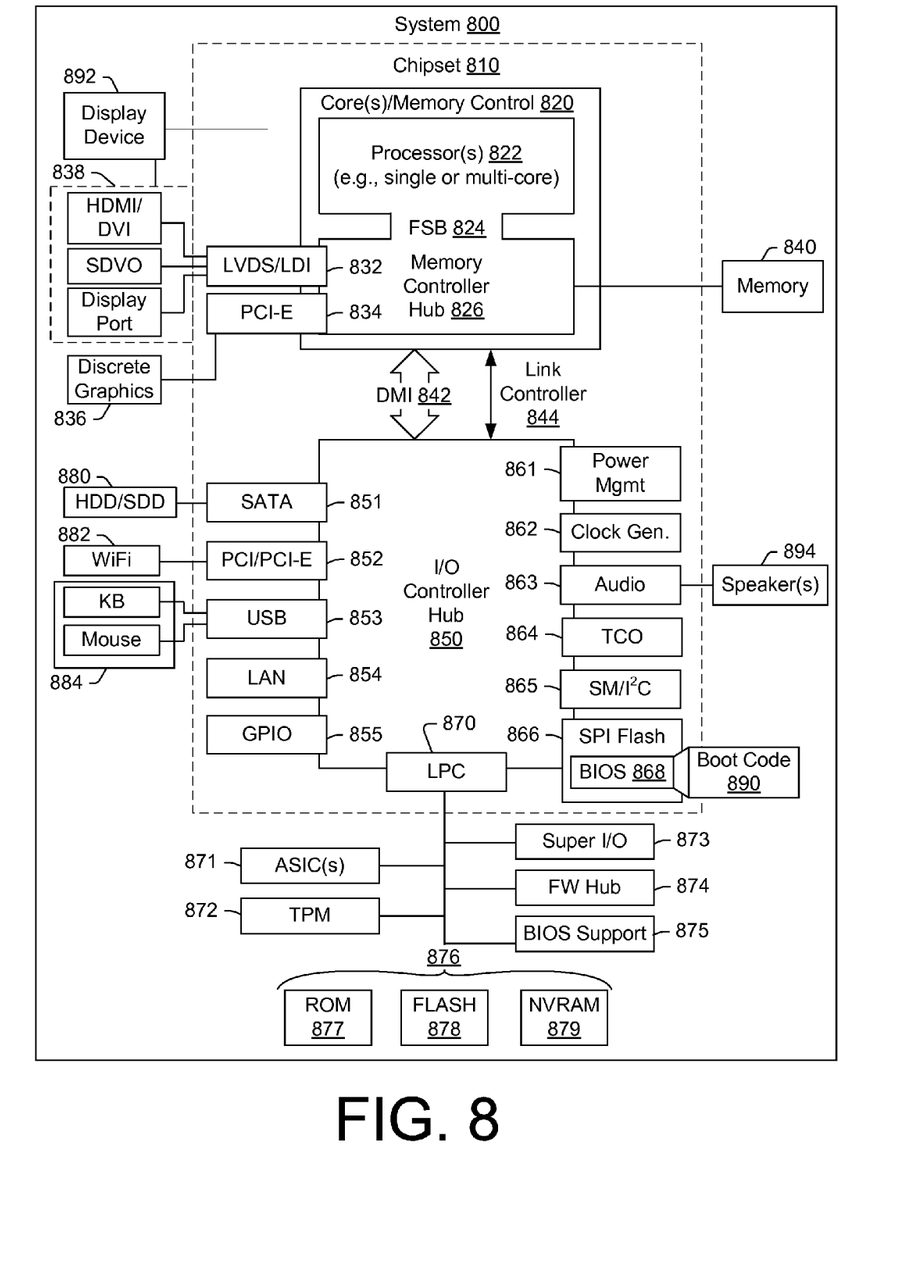
FIG. 8 is a diagram of an exemplary machine, which may be a client device, a server or other apparatus.

While various exemplary circuits or circuitry have been discussed, FIG. 8 depicts a block diagram of an illustrative exemplary computer system 800. The system 800 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine may include other features or only some of the features of the system 800.

As shown in FIG. 8, the system 800 includes a so-called chipset 810. A chipset refers to a group of integrated circuits, or chips, that are designed to work together. Chipsets are usually marketed as a single product (e.g., consider chipsets marketed under the brands INTEL®, AMD®, etc.).

In the example of FIG. 8, the chipset 810 has a particular architecture, which may vary to some extent depending on brand or manufacturer. The architecture of the chipset 810 includes a core and memory control group 820 and an I/O controller hub 850 that exchange information (e.g., data, signals, commands, etc.) via, for example, a direct management interface or direct media interface (DMI) 842 or a link controller 844. In the example of FIG. 8, the DMI 842 is a chip-to-chip interface (sometimes referred to as being a link between a "northbridge" and a "southbridge").

The core and memory control group 820 include one or more processors 822 (e.g., single core or multi-core) and a memory controller hub 826 that exchange information via a front side bus (FSB) 824. As described herein, various components of the core and memory control group 820 may be integrated onto a single processor die, for example, to make a chip that supplants the conventional "northbridge" style architecture.

The memory controller hub 826 interfaces with memory 840. For example, the memory controller hub 826 may provide support for DDR SDRAM memory (e.g., DDR, DDR2, DDR3, etc.). In general, the memory 840 is a type of random-access memory (RAM). It is often referred to as "system memory".

The memory controller hub 826 further includes a low-voltage differential signaling interface (LVDS) 832. The LVDS 832 may be a so-called LVDS Display Interface (LDI) for support of a display device 892 (e.g., a CRT, a flat panel, a projector, etc.). A block 838 includes some examples of technologies that may be supported via the LVDS interface 832 (e.g., serial digital video, HDMI/DVI, display port). The memory controller hub 826 also includes one or more PCI-express interfaces (PCI-E) 834, for example, for support of discrete graphics 836. Discrete graphics using a PCI-E interface has become an alternative approach to an accelerated graphics port (AGP). For example, the memory controller hub 826 may include a 16-lane (×16) PCI-E port for an external PCI-E-based graphics card. An exemplary system may include AGP or PCI-E for support of graphics.

The I/O hub controller 850 includes a variety of interfaces. The example of FIG. 8 includes a SATA interface 851, one or more PCI-E interfaces 852 (optionally one or more legacy PCI interfaces), one or more USB interfaces 853, a LAN interface 854 (more generally a network interface), a general purpose I/O interface (GPIO) 855, a low-pin count (LPC) interface 870, a power management interface 861, a clock generator interface 862, an audio interface 863 (e.g., for speakers 894), a total cost of operation (TCO) interface 864, a system management bus interface (e.g., a multi-master serial computer bus interface) 865, and a serial peripheral flash memory/controller interface (SPI Flash) 866, which, in the example of FIG. 8, includes BIOS 868 and boot code 890. With respect to network connections, the I/O hub controller 850 may include integrated gigabit Ethernet controller lines multiplexed with a PCI-E interface port. Other network features may operate independent of a PCI-E interface.

The interfaces of the I/O hub controller 850 provide for communication with various devices, networks, etc. For example, the SATA interface 851 provides for reading, writing or reading and writing information on one or more drives 880 such as HDDs, SDDs or a combination thereof. The I/O hub controller 850 may also include an advanced host controller interface (AHCI) to support one or more drives 880. The PCI-E interface 852 allows for wireless connections 882 to devices, networks, etc. The USB interface 853 provides for input devices 884 such as keyboards (KB), mice and various other devices (e.g., cameras, phones, storage, media players, etc.).

In the example of FIG. 8, the LPC interface 870 provides for use of one or more ASICs 871, a trusted platform module (TPM) 872, a super I/O 873, a firmware hub 874, BIOS support 875 as well as various types of memory 876 such as ROM 877, Flash 878, and non-volatile RAM (NVRAM) 879. With respect to the TPM 872, this module may be in the form of a chip that can be used to authenticate software and hardware devices. For example, a TPM may be capable of performing platform authentication and may be used to verify that a system seeking access is the expected system.

The system 800, upon power on, may be configured to execute boot code 890 for the BIOS 868, as stored within the SPI Flash 866, and thereafter processes data under the control of one or more operating systems and application software (e.g., stored in system memory 840). An operating system may be stored in any of a variety of locations and accessed, for example, according to instructions of the BIOS 868. Again, as described herein, an exemplary client device or other machine may include fewer or more features than shown in the system 800 of FIG. 8.

Figure 9:
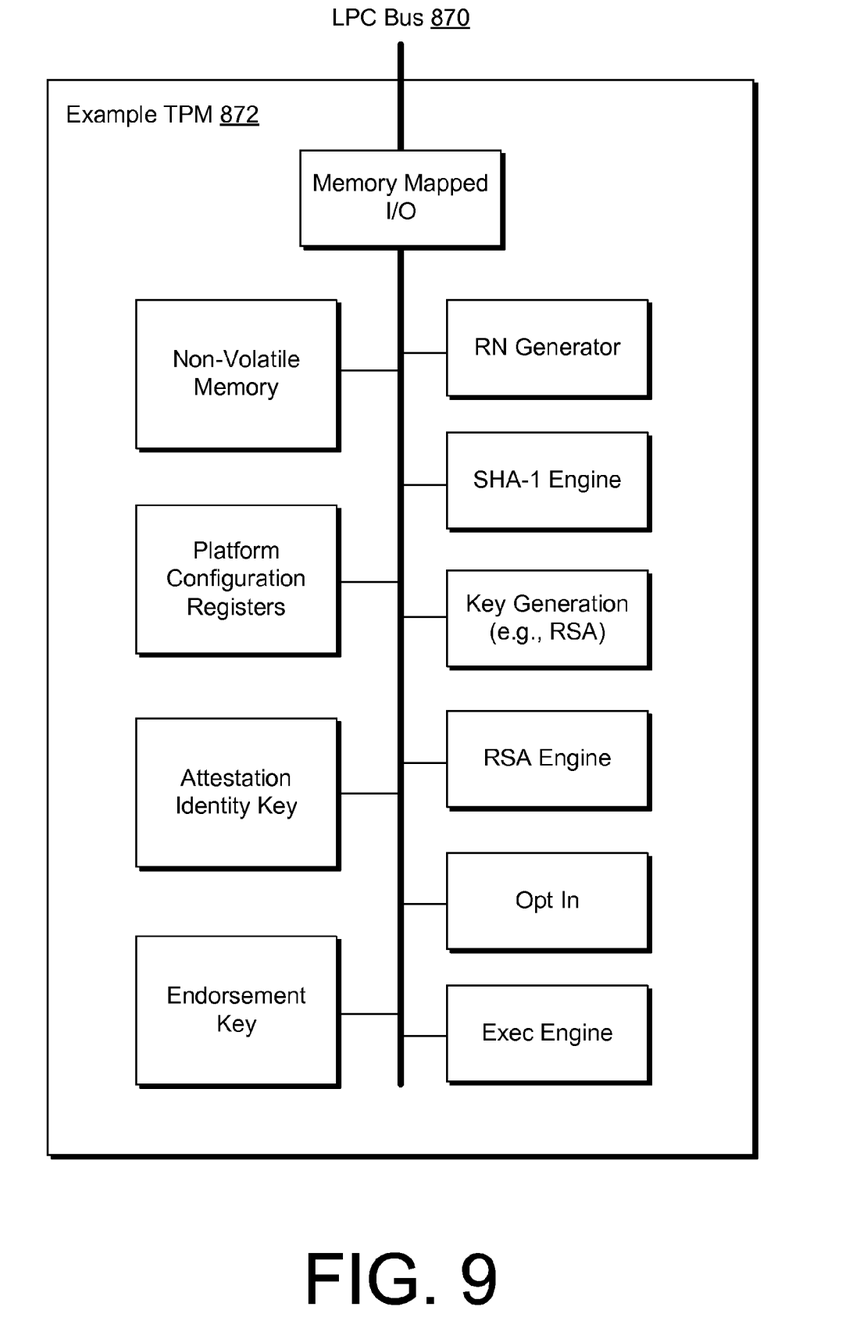
FIG. 9 is a diagram of a trusted platform module (TPM) suitable as a component of or for use with the machine of FIG. 8.

FIG. 9 shows in more detail various components of the TPM 872 of the system 800. In the example of FIG. 9, the TPM 872 includes a memory mapped I/O component for communication via the LPC bus 870, non-volatile storage, platform configuration registers (PCRs), an attestation identity key, an endorsement key, a random number generator, a SHA-1 engine for performing SHA-1 hash operations, a key generation component for generation of keys (e.g., RSA keys), an RSA engine, an optional input module and an execution engine.

As described herein, a client device may include instructions that cause a TPM such as the TPM 872 to perform actions. For example, the hypervisor 470 of FIG. 4 may instruct the TPM 872 to use the SHA-1 engine to hash financial transactions information and to store a resulting hash in a secure register of the TPM's non-volatile memory. Where a signature or a certificate require authentication (e.g., validation, verification, etc.), instructions may cause a TPM such as the TPM 872 to perform various acts (e.g., to facilitate electronic financial transactions). Accordingly, an exemplary client device may include a TPM that acts to ensure secure communications (e.g., with a merchant, a financial institution, etc.) and that acts to securely store one or more hashes based on financial transactions information. Such a device may further rely on one or more hash functions of a TPM to generate hashes (e.g., whether destined for storage in secure non-volatile memory or for other destination(s) or purpose(s)).

CONCLUSION

Although exemplary methods, devices, systems, etc., have been described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

What is claimed is:

1. A method comprising:
    transmitting, via a network interface of a computing platform, at least a currency amount in an attempt to confirm a financial transaction;
    responsive to the transmitting, receiving via the network interface a confirmation indicator for the financial transaction;
    storing at least the currency amount in a non-volatile memory device of the computing platform;
    accessing a secure non-volatile memory device of a trusted platform module of the computing platform according to at least a trusted platform module owner credential and a security protocol of the trusted platform module, hashing at least the currency amount using a hash engine of the trusted platform module to generate a hash and storing the hash in the secure non-volatile memory device of the trusted platform module;
    hashing at least the currency amount stored in the non-volatile memory device of the computing platform to generate a verification hash; and
    in an attempt to verify at least the financial transaction, comparing the verification hash to the hash stored in the secure non-volatile memory device of the trusted platform module of the computing platform.

2. The method of claim 1 wherein the hashing at least the currency amount to generate a hash comprises hashing at least the currency amount and an existing hash, the existing hash associated with one or more other financial transactions.

3. The method of claim 1 wherein the hash stored in the secure non-volatile memory device comprises a hash generated by hashing at least currency amounts for multiple financial transactions and wherein the verification hash comprises a hash generated by hashing at least currency amounts for multiple financial transactions.

4. The method of claim 1 further comprising, to facilitate remote verification of at least the financial transaction, transmitting the hash stored in the secure non-volatile memory device via the network interface of the computing platform, transmitting the verification hash via the network interface of the computing platform or transmitting the hash stored in the secure non-volatile memory device of the trusted platform module of the computing platform and the verification hash via the network interface of the computing platform.

5. The method of claim 1 wherein the accessing the secure non-volatile memory device of the trusted platform module of the computing platform according to the security protocol of the trusted platform module comprises providing an identifier value as the trusted platform module ownership credential and providing a platform configuration register (PCR) value.

6. The method of claim 1 wherein the accessing the secure non-volatile memory device of the trusted platform module of the computing platform according to the security protocol of the trusted platform module further comprises providing a PCR value associated with a hypervisor executing on the computing platform.

7. The method of claim 1 further comprising executing a hypervisor to at least perform the accessing.

8. The method of claim 1 further comprising issuing a verification indicator where the comparing finds that the hashes match.

9. The method of claim 1 further comprising issuing an alert where the comparing finds that the hashes do not match.

10. The method of claim 1 further comprising maintaining the hash stored in the secure non-volatile memory device of the trusted platform module while re-booting the computing platform.

11. The method of claim 10 further comprising loading a hypervisor and measuring code associated with the hypervisor and storing a corresponding value in a platform configuration register (PCR) of the trusted platform module.

12. The method of claim 11 further comprising accessing the secure non-volatile memory device of the trusted platform module of the computing platform according to the trusted platform module owner credential, the value associated with the hypervisor and a security protocol of the trusted platform module.

13. The method of claim 12 wherein the hypervisor calls for the accessing.

14. A system comprising:
one or more processors;
a storage device;
a trusted platform module that comprises a secure non-volatile memory device and a hash engine;
a network interface; and
circuitry configured
- to transmit via the network interface, at least a currency amount in an attempt to confirm a financial transaction;
- to receive a confirmation indicator for the financial transaction;
- to store at least the currency amount in the storage device;
- to access the secure non-volatile memory device of the trusted platform module according to at least a trusted platform module owner credential and a security protocol of the trusted platform module, to hash at least the currency amount using the hash engine of the trusted platform module to generate a hash and to store the hash in the secure non-volatile memory device of the trusted platform module;
- to hash at least the currency amount stored in the storage device to generate a verification hash; and,
- in an attempt to verify at least the financial transaction, to compare the verification hash to the hash stored in the secure non-volatile memory device of the trusted platform module.

15. The system of claim 14 wherein the circuitry further comprises a hypervisor to call for access to the secure non-volatile memory device according to the security protocol.

16. The system of claim 15 further comprising one or more platform configuration registers (PCRs) wherein the security protocol relies on a PCR value associated with the hypervisor.

* * * * *